June 20, 1961 W. A. JOERNDT 2,989,708
COMBINED MODULATOR-ATTENUATOR
Filed June 26, 1952 5 Sheets-Sheet 1

INVENTOR
WILBUR A. JOERNDT
BY
ATTORNEYS

INVENTOR
WILBUR A. JOERNDT

INVENTOR
WILBUR A. JOERNDT

June 20, 1961 W. A. JOERNDT 2,989,708
COMBINED MODULATOR-ATTENUATOR
Filed June 26, 1952 5 Sheets-Sheet 5

INVENTOR
WILBUR A. JOERNDT
BY
ATTORNEYS

2,989,708
COMBINED MODULATOR-ATTENUATOR
Wilbur A. Joerndt, Albuquerque, N. Mex., assignor to the United States of America as represented by the Secretary of the Navy
Filed June 26, 1952, Ser. No. 295,636
5 Claims. (Cl. 333—81)

This invention relates generally to wave guide modulators, and more particularly to a combined wave guide modulator and attenuator to be used either for superimposing a thirty (30) cycle amplitude variation on a pulse time modulated wave or to provide a constant attenuation thereof. The invention can also be used with other apparatus to simulate the signal picked up by the guidance receivers of "radar beam riding" guided missiles.

In "beam riding" guidance systems for guided missiles, it has been the practice to guide the missile after it is launched and is in free flight by establishing the missile's course along the axis of a cone of revolution generated by the radiation pattern of a nutating, highly directive beam of electromagnetic energy. As long as the missile's position is along the axis of the cone of revolution, the signals present at the input to the guidance receivers situated in the missile are of constant amplitude and no actuation of the guiding control system of the missile by the receivers takes place.

Upon the missile's deviating in course from along the axis of the cone, it is displaced into the path of the nutating beam and as a consequence the steady state signal, present at the input of the guidance receivers when the missile is properly oriented, is replaced by a second signal, amplitude modulated at the frequency of revolution of the nutating beam. This amplitude modulated signal is employed to actuate the guiding control system of the missile.

It is one of the objects of this invention to simulate the signals present at the input of the guidance receivers of the "beam riding" guided missile for various positions that the missile might assume within the nutating beam.

A further object of this invention is to provide a combined wave guide modulator-attenuator for either modulating or attenuating a radio frequency wave.

A still further object of the invention is to provide a mechanically operated combined wave guide modulator-attenuator for selectively modulating a pulse time modulated radio frequency wave with a thirty (30) cycle per second amplitude variation or, alternatively, attenuating the radio frequency wave a desired amount.

Other objects and many of the attendant advantages of this invention will be appreciated readily as the same becomes understood by reference to the following detailed description, when considered in connection with the accompanying drawings, wherein.

In accordance with the invention, the signals present at the input of guidance receivers of "beam riding" guided missiles are simulated for various positions that the missile might assume within a nutating beam. This is accomplished by means of a wave guide section having a slot provided in the upper wall thereof, together with means for selectively inserting either one of two electromagnetic energy absorption devices into the slit to affect the radio frequency wave passing through the wave guide in the desired manner.

Figure 1:
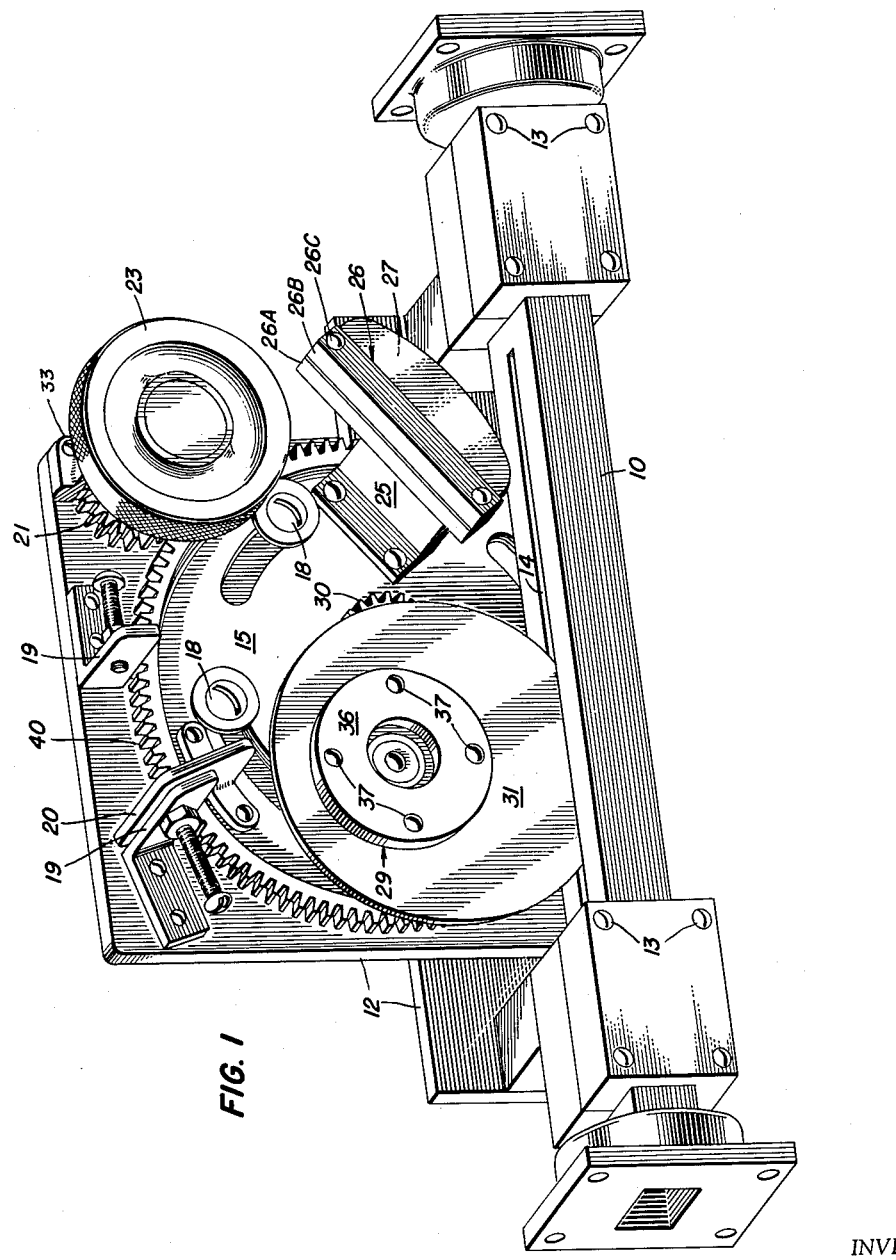
FIG. 1 is a perspective view with parts removed of a wave guide modulator-attenuator, embodying the features of the invention.
Figure 4:
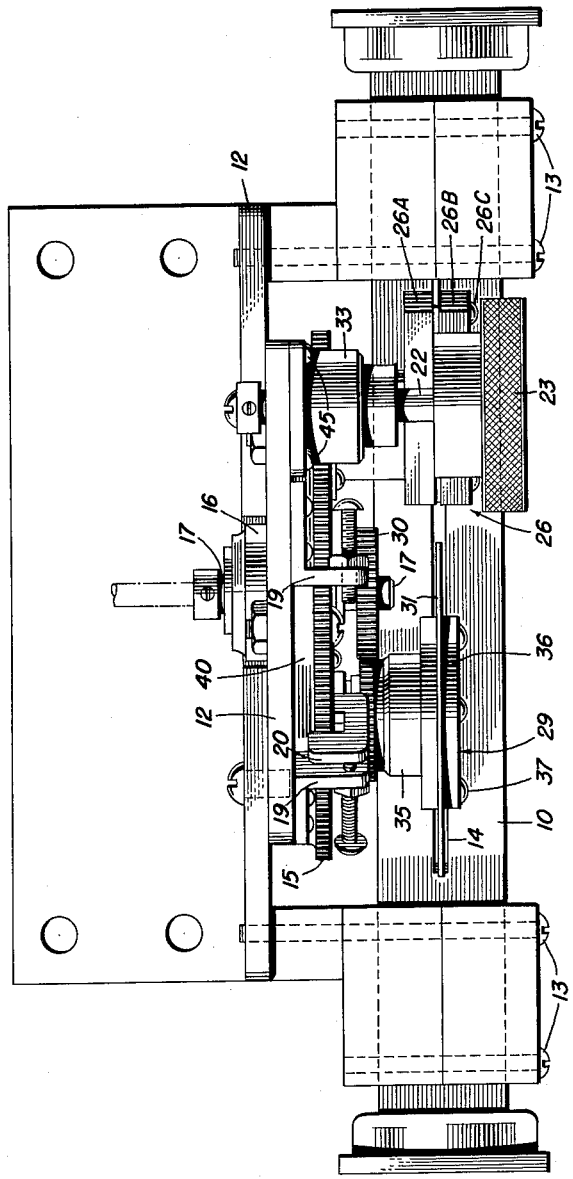
FIG. 4 is a top view of the combined modulator-attenuator shown in FIG. 1.

Referring now to the drawings, there is shown in FIGS. 1 and 4 a wave guide section 10 carried in suitable brackets which are bolted to a base plate 12 by bolts 13 and having a longitudinal slot 14 cut in the upper wall thereof. Also mounted upon the base plate 12 is a turntable 15 that rotates about a journal which consists of a collar 16, best illustrated in FIG. 5 of the drawings, in which are mounted the ball bearings 38 and 39 that support a drive shaft 17 which is situated in the geometrical center of the turntable 15. Turntable 15 is provided with slots which permit it to be secured to base plate 12 by bolts 18 in such a manner that restricted angular movement of the turntable is allowed, the angular movement of the turntable 15 being determined by a pair of stops 19 mounted upon the base plate and coacting with a lug 20 mounted upon the turntable 15.

Figure 6:
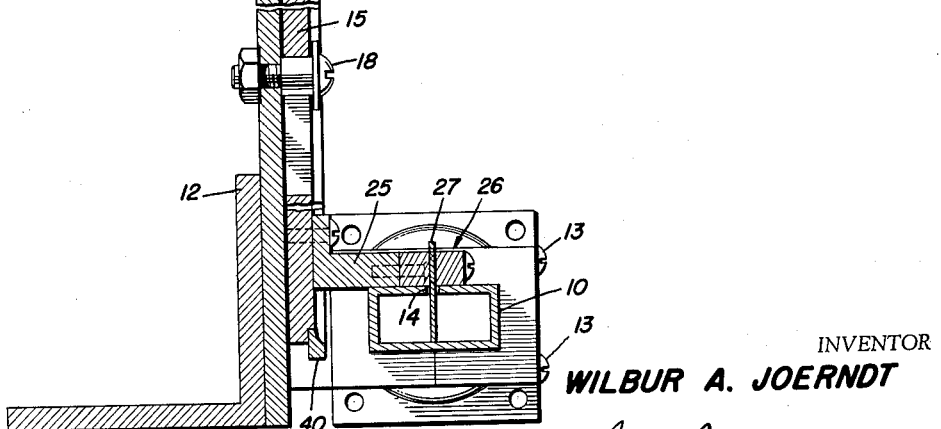
FIG. 6 is a cross section taken on the plane 6—6 of FIG. 3.

The turntable 15 is driven by a gear 21 that is keyed to a shaft 22, best shown in FIGS. 1 and 6 of the drawings, which is, in turn, keyed to a control knob 23. Thus, by turning the control knob 23, the gear 21 will cause turntable 15 to be rotated about collar 16. The construction of gear 21, shaft 22, and control knob 23, and the manner of their mounting, will be discussed more fully hereinafter.

Figure 2:
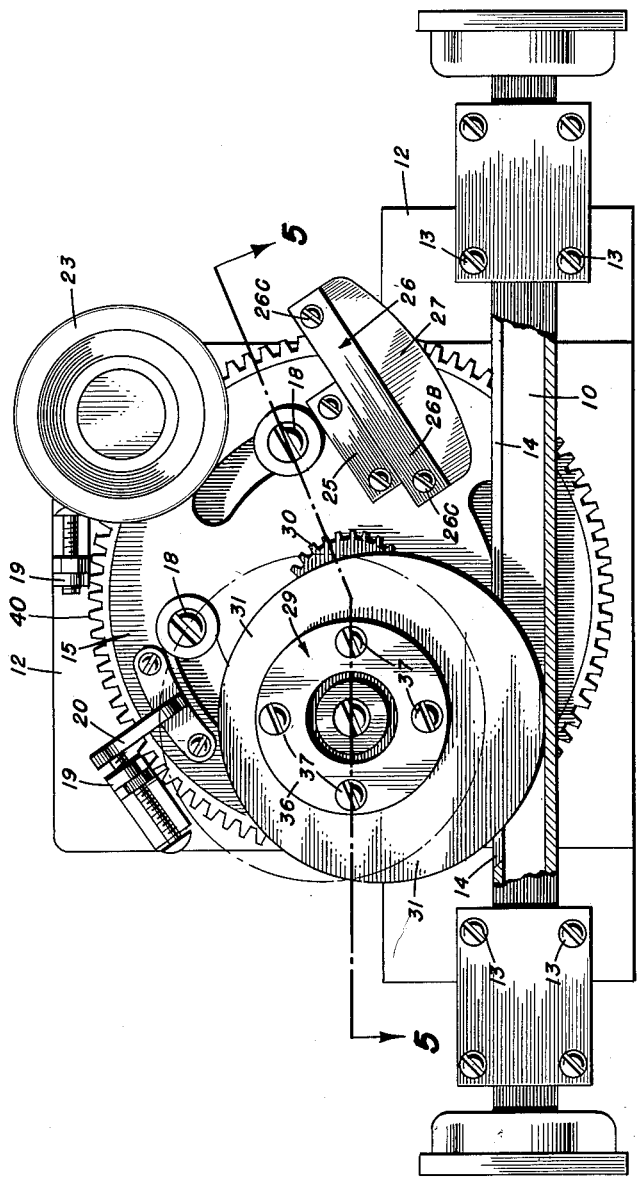
FIG. 2 is a front view of the modulator-attenuator shown in FIG. 1 as it appears when positioned to provide amplitude modulation of a radio frequency wave.
Figure 3:
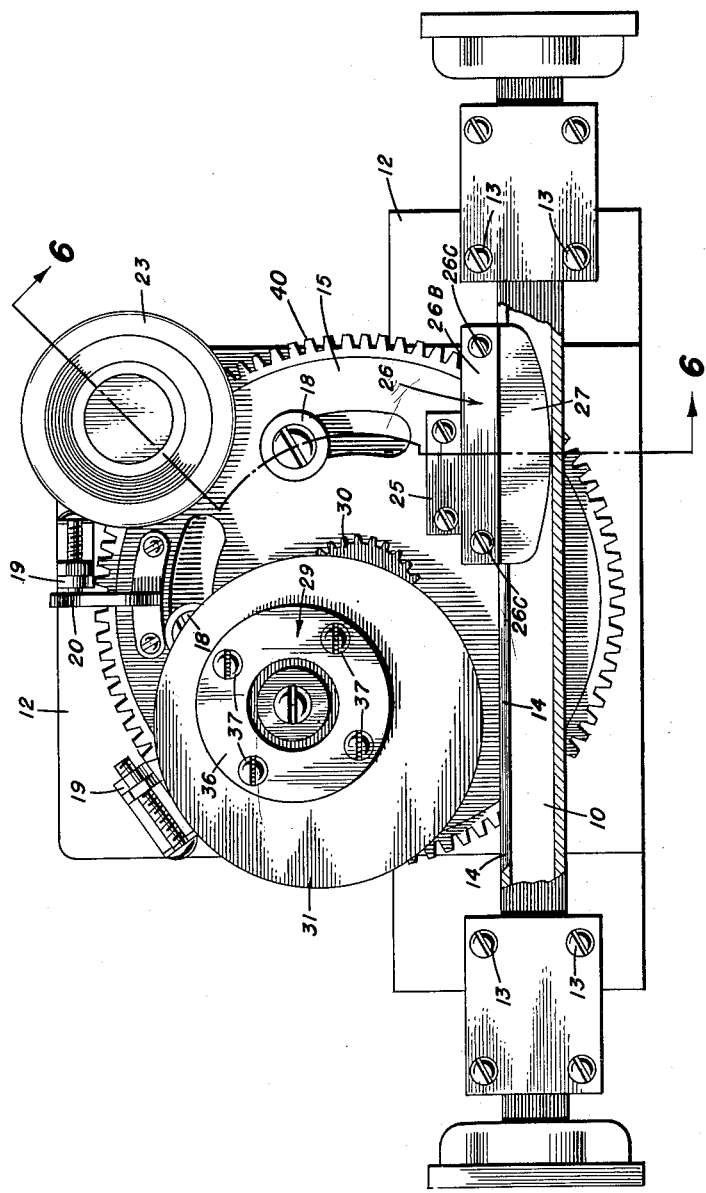
FIG. 3 is a front view of combined modulator-attenuator shown in FIG. 1 as it appears when positioned to provide a constant attenuation of the applied radio frequency wave.

As shown in FIGS. 2 and 3, there is bolted near the periphery of turntable 15, a standard 25 having an arm 26 to which is attached an electromagnetic energy absorption device 27, such as a coated Bakelite sheet. Upon the turntable 15 being revolved in a clockwise direction, the absorption device 27 is inserted into the wave guide 10 through the slot 14, as shown in FIG. 3 of the drawings.

Also fixedly mounted near the periphery of the turntable 15 is a shaft 28 upon which is journaled a flywheel 29, the construction of which will be discussed more fully with relation to FIG. 5. Flywheel 29 is driven by a gear 30, which, in turn, is keyed to, and driven by, shaft 17. A circular energy absorption device 31, which may be of the same material as the absorption device 27, is eccentrically carried on the flywheel 29 in such a manner that it extends outwardly from the circumference of the flywheel. When the turntable 15 is rotated to its counter-clockwise position, the absorption device 31, because of its eccentric shape, will be cyclically lifted from and inserted into wave guide 10 as the flywheel 29 rotates. As shown in FIG. 2 of the drawings, the turntable 15 is in its full counter-clockwise position.

The construction of several of the elements of the wave guide modulator-attenuator are more clearly shown in FIG. 4. In particular the underpart of a collar 33, which is hidden from view, is open so as to allow the teeth of gear 21 to mesh with the teeth provided on the circumference of the turntable 15. The turntable 15 is shown as having gear teeth about its entire circumference. Such construction is not essential to the operation of the unit, for only a small arc on the circumference of the turntable need be geared, to assure proper operation of the invention. The flywheel 29 is shown as consisting of a base 35 which is geared to and driven by gear 30, and a face plate 36. The eccentrically mounted electromagnetic energy absorption device 31 is inserted between the base 35 and face plate 36 of the flywheel 29, and secured thereto by means of tightening screws 37. The arm 26 of the standard 25 likewise consists of a base 26A and a face plate 26B between which the fixed attenuator element 27 is secured by means of screws 26C.

Figure 5:
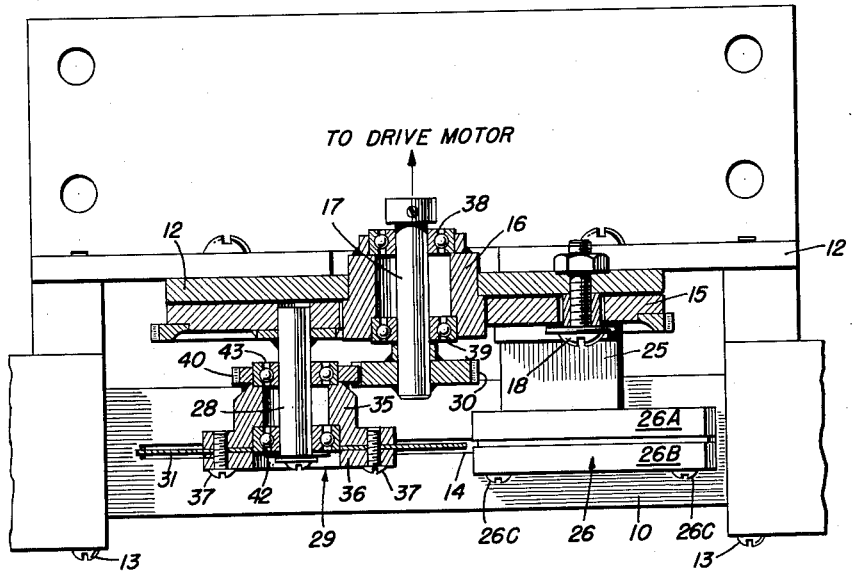
FIG. 5 is a cross section taken on the plane 5—5 of FIG 2.

FIG. 5 of the drawings shows a sectional view of the invention, taken along the line 5—5 of FIG. 2, and discloses more fully the construction of flywheel 29 and turntable 15. The shaft 17 is flexibly coupled to a drive motor (not shown) and is mounted in a set of ball bearings 38 and 39. The ball bearings 38 and 39 are, in turn, mounted in collar 16 which serves as a journal for the turntable 15. Keyed to shaft 17 is gear 30 which meshes with and drives a gear 40 that, in turn, is secured to the base 35 of flywheel 29 and may comprise a part thereof.

The entire flywheel assembly including gear 40 is mounted on ball bearings 42 and 43 which are secured to pedestal shaft 28. Shaft 28 is carried adjacent the periphery of turntable 15 so that as the flywheel 29 rotates the revolving eccentric absorption device 31 may be either cyclically inserted into and withdrawn from the wave guide 10 or alternatively may be completely withdrawn from the wave guide 10 depending upon the position of turntable 15.

FIG. 6 of the drawing discloses more fully the construction of the turntable driving assembly. The collar 33, the under part of which is open, is bolted to the base plate 12 by bolts 45, and it serves to mount the roller bearings 46 which provide a journal for the shaft 22, in addition to the journal provided by the base plate 12. Keyed to shaft 22 is gear 21 which meshes with the teeth on turntable 15 through the opening in the under part of collar 33. Also keyed to the shaft 22 is the control knob 23 which serves to control the direction of rotation of the turntable 15 by reason of the above described assembly.

Having described the construction of the combined wave guide modulator-attenuator, its operation is as explained below. The shaft 17 is continually rotated at a speed of 1800 revolutions per minute or 30 revolutions per second. Gears 30 and 40 have a 1 to 1 ratio. Therefore, flywheel 29 and the eccentrically mounted absorption device 31 are rotated at the same speed. By turning the control knob 23 so as to rotate turntable 15 counterclockwise, the device 31 will be inserted into and withdrawn from the wave guide 10 at a thirty (30) cycle per second rate thereby to superimpose a thirty (30) cycle amplitude variation upon the radio frequency wave passing through the wave guide. Upon turning the control knob 23 in the opposite direction so as to rotate turntable 15 clockwise, the entire assembly which drives the device 31 will be lifted to a position such that said device can no longer enter the wave guide and the fixed attenuator 27 will be inserted in its place to provide a constant attenuation of the radio frequency wave passing through the wave guide.

Though the above operation has been described with reference to the two extreme operating conditions of the combined modulator-attenuator, it should be understood that the turntable 15 may be rotated to an intermediate position so as to provide any desired amount of modulation, and/or attenuation of the radio frequency wave in the wave guide, to thereby simulate the beam riding control signal present at the input of the guidance receivers for any position that a "beam riding" guided missile might assume within the nutating beam.

Obviously many modifications and variations of the present invention are possible in the light of the above teachings. It is therefore to be understood that within the scope of the appended claims the invention may be practiced otherwise than as specifically described.

What is claimed is:

1. In a combined microwave modulator and attenuator, a section of waveguide having a longitudinally extending slot, means insertable into said slot in said waveguide for modulating a radio frequency wave passing therethrough, means insertable into said slot in said waveguide for attenuating a radio frequency wave passing therethrough, and means for inserting either said modulating means or said attenuating means, or both, into said waveguide, said attenuating means including a fixed absorption device mounted on said inserting means.

2. In a combined microwave modulator and attenuator as recited in claim 1, wherein the inserting means comprises a turntable rotatably mounted in spaced relation to said waveguide.

3. A combined microwave modulator and attenuator, comprising a waveguide section having a slot in a wall thereof, a pair of electromagnetic energy absorption devices, and means for inserting either one or both of said absorption devices into said waveguide through said slot, one of said absorption devices being fixed relatively to the inserting means and the other of said absorption devices being reciprocally movable with respect to said inserting means and said waveguide.

4. A combined microwave modulator and attenuator, comprising a waveguide section having a slot in a wall thereof, a pair of electromagnetic energy absorption devices, and means for inserting either one or both of said absorption devices into said waveguide through said slot, one of said absorption devices being fixed on said inserting means and the other of said devices being rotatably mounted on said inserting means, said rotatably mounted absorption device comprising a disk of radio frequency absorption material arranged eccentrically on said inserting means.

5. A wave guide modulator-attenuator, comprising, a section of wave guide having a longitudinal slot in one wall therein, a base plate for mounting said wave guide section, the plane of said longitudinal slot being perpendicular to the plane of said base plate, a circular turntable rotatably mounted on said base plate between said base plate and said wave guide section, the plane of said turntable being parallel to the plane of the base plate, a pair of spaced electromagnetic energy absorption devices, one of said pair of energy absorption devices being fixed on said turntable and the other one of said pair of energy absorption devices being rotatably mounted on said turntable, said rotatably mounted absorption device comprising an eccentrically mounted, circular disc of absorption material, said devices being selectively insertable into said slot in said wave guide in accordance with the direction of rotation of said turntable, and means for rotating said turntable.

References Cited in the file of this patent

UNITED STATES PATENTS

| | | |
|---|---|---|
| 2,426,992 | Folland | Sept. 9, 1947 |
| 2,505,557 | Lyman | Apr. 25, 1950 |
| 2,532,817 | Lafferty | Dec. 5, 1950 |
| 2,544,715 | Muchmore | Mar. 13, 1951 |
| 2,613,270 | King | Oct. 7, 1952 |
| 2,619,538 | Grant | Nov. 25, 1952 |